United States Patent Office 3,321,515
Patented May 23, 1967

3,321,515
METHOD OF MAKING FLUORINATED
CARBONYL COMPOUNDS
Earl Phillip Moore and Alwin S. Milian, Wilmington,
Del., assignors to E. I. du Pont de Nemours and Company, Wilmington, Del., a corporation of Delaware
No Drawing. Filed Apr. 24, 1963, Ser. No. 275,231
10 Claims. (Cl. 260—544)

This invention relates to a novel synthesis of fluorinated organic carbonyl compounds, and more particularly to the catalytic rearrangement of fluoroolefin epoxides to yield fluorinated organic ketones and acid fluorides.

Recently, methods have been discovered for the economical synthesis of fluorocarbon epoxides. In particular, an extremely wide variety of fluorocarbon epoxides may be made from the corresponding perfluoroolefins having at least three carbon atoms by the action of alkaline hydrogen peroxide at temperatures in the range between about $-35$ and $+50°$ C., perferably, in the presence of an alcohol such as methanol.

It has now been discovered that the fluoroolefin epoxides may be readily converted to carbonyl compounds by the action of certain catalysts.

The present invention, in its broadest aspect, therefore embraces the process of contacting a compound having the formula

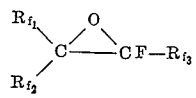

wherein $R_{f_1}$, $R_{f_2}$ and $R_{f_3}$ are fluorine radicals, perfluoroalkyl radicals having from 1 to 8 carbon atoms, omega-hydroperfluoroalkyl radicals having from 1 to 8 carbon atoms and, pairwise, perfluoroalkylene biradicals having from 2 to 8 carbon atoms, with a catalytic amount of a catalyst which may be an acidic metal oxide, a chloride, bromide or iodide of a polyvalent metal having a valence less than the maximum coordination number, a transition metal carbonyl, or a compound which produces fluoride ions in the reaction medium, such as a tertiary amine, a tertiary amine oxide, or a tertiary amide, and thereafter recovering a carbonyl compound from the reaction product.

The catalysts effective for the process of this invention may be classified as Lewis acids or Lewis bases. In this connection, a Lewis acid denotes a molecule or ion which is capable of accepting an electron pair from another molecule or ion which is thus a Lewis base.

The rearrangement reaction induced by the acidic catalysts evidently differs in mechanism from that induced by Lewis bases. In most cases, this is immaterial. However, in the special case of the epoxides of the 1-olefins, the stronger Lewis acids rearrange the epoxide substantially exclusively to the trifluoromethyl ketone, whereas the Lewis bases rearrange the epoxide to the isomeric acid fluoride.

The acidic catalysts which are effective in the process of this invention are:

(1) Acidic metal oxides such as $Al_2O_3$, $TiO_2$, $WO_2$ and the like of which gamma-alumina is a preferred catalyst;

(2) Chlorides, bromides, and iodides and oxyhalides of polyvalent metals having a valence less than the maximum coordination number. Examples of such halides are $AlCl_3$, $AlBr_3$, $SnCl_4$, $VoCl_3$, $TiCl_4$, $FeCl_3$, $CuCl_2$, $ZrOCl_2$ and the like, of which aluminum trichloride is perferred;

(3) Transition metal carbonyls such as tungsten carbonyl and iron carbonyl;

With regard to the basic catalysts which may be employed, these may be classified:

(4) Fluorine compounds having an ionizable fluorine atom including the alkali metal fluorides and acid fluorides such as KF, $KHF_2$ and CsF, which is preferred, $PF_5$, $SF_4$ and the like. The fluoride ion appears to be the effective catalyst in these compounds and even compounds which might otherwise be regarded as Lewis acids, but which, nevertheless, are capable of yielding fluoride ions, act as bases in this context. Thus $BF_3$ etherate acts as a weakly basic catalyst in the process of this invention. Other alkaline materials which are capable of reacting with the epoxide reactant to yield intermediates having ionizable fluorine are also found to be effective in promoting the rearrangement in this invention. Examples of such compounds are the alkali metal carbonates, the hydroxides of the alkali and alkaline earth metals and the reduced oxides of transition metals;

(5) Tertiary amines, including tertiary aliphatic amines, tertiary aromatic amines, and heterocyclic compounds having a tertiary nitrogen atom in an aromatic ring system. Included in this group is trimethylamine, triethylamine, dimethylaniline, pyridine and the like;

(6) Amine oxides such as pyridine N-oxide, trimethylamine N-oxide and the like; and (7) Tertiary amides such as dimethylformamide, dimethylacetamide, diethylbenzamide and the like.

The rearrangement reaction requires the formation of a carbonyl group at one carbon atom of the epoxide ring accompanied by the migration of a fluorine atom to the other carbon atom. Thus, it is essential that at least one fluorine atom be attached directly to a carbon atom of the epoxide ring.

The perfluoroolefin epoxides may be broadly classified according to whether 1, 2, or 3 of the 4 fluorine atoms are substituted by a fluorocarbon radical.

This invention also embraces the case of unsubstituted perfluoroethylene epoxide which rearranges with great ease in the presence of either acid or basic catalysts to give perfluoroacetyl fluoride.

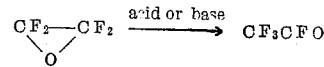

Monosubstituted perfluoroethylene epoxides rearrange to give an acid fluoride with basic catalysts or to a perfluoromethyl ketone with acidic catalysts.

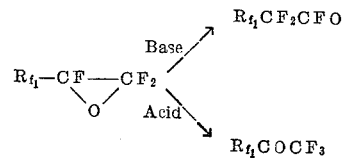

In the case of symmetrically disubstituted perfluoroethylene oxides, the products of the reaction are ketones.

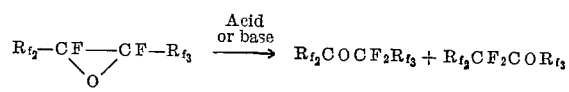

In the case of a perfluoroethylene oxide disubstituted at a single carbon atom, the product of rearrangement by the process of this invention is an acid fluoride.

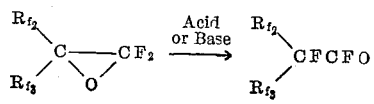

In the case of trisubstituted perfluoroethylene epoxides, the product resulting from the rearrangement of this invention is a ketone.

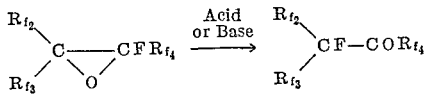

In the above formulae, the radicals $R_{f_1}$, $R_{f_2}$, $R_{f_3}$, and $R_{f_4}$ are perfluoroalkyl or omega-hydroperfluoroalkyl radical containing from 1 to 8 carbon atoms. Specifically included in this definition are branched perfluoroalkyl radicals and omega-hydroperfluoroalkyl radicals, and perfluoroalkyl radicals containing cyclic groups. In addition to the aforegoing $R_{f_2}$, $R_{f_3}$, and $R_{f_4}$ may represent one end of a fluoroalkyl biradical, i.e., the rearrangement reaction of this invention is applicable to cyclic compounds containing an epoxide ring fused to the cyclic group and to cyclic compounds in which the epoxide ring is in spiro-cyclic conformation with a cyclic group.

Various means for contacting the fluorocarbon epoxides with the catalysts may be employed. The reaction may be performed by contacting the gaseous fluorocarbon epoxide with the catalyst in suitable cases. The catalysts may also be contacted with the epoxide in the liquid state, either pure or in the presence of chemically inert solvent or diluents. In this context, the expression "chemically inert" refers to a diluent which does not react with the reactant epoxide, with the resultant carbonyl compound, or with the catalyst. For use in the liquid phase, solvents are preferably polar liquids. These include liquid sulfur dioxide, alkyl sulfones, ethers such as dimethyl, ether, diethyl ether, methyl isopropyl ether, dioxane and furane, ethylene glycol ethers, and the like, ketones such as acetone, methylethyl ketone, methylisopropyl ketone, and the like, and nitriles such as methyl cyanide, ethyl cyanide, and benzonitrile. The above classification is merely an indication of suitable solvents and is by no means exhaustive. Hydrocarbons including olefins, or liquid fluorocarbons including the perfluoroolefins, may be present as liquid diluents. While the perfluoroolefins are not preferred solvents which tend to promote the reaction, it will be observed that the common method of preparation of the epoxides is by epoxidation of the corresponding olefins. Thus, it is by no means essential that an epoxide be purified from the residual parent olefin prior to conversion of the epoxide to the isomeric carbonyl compound by the process of this invention.

When the epoxide is contacted with the catalyst in the gas phase, similar, chemically inert, gaseous diluents may be present.

The temperature at which the reaction may be performed is not critical. Temperatures between about −80° C. and +300° C. have been successfully employed. The upper temperature limit is substantially defined by the temperature at which decomposition of the perfluoroolefin becomes appreciable. Some perfluoroolefin epoxides, particularly the epoxides of the perfluoroolefins having a terminal epoxide group, decompose to some extent in the absence of catalysts at temperatures as low as 100° C. On the other hand, the epoxides of cyclic perfluoroolefins such as perfluorocyclohexane epoxide and perfluorocyclopentene epoxide are substantially more thermally stable than the corresponding open chain compounds and the rearrangement reaction of this invention may be accomplished at temperatures exceeding 300° C. Generally speaking, the ease with which the rearrangement reaction of this invention tends to take place varies in the same manner as the thermal stability of the parent epoxide, the temperature sensitive epoxides tending to rearrange more readily than those which are less temperature sensitive.

The time required for the reaction varies with the temperature and with the nature and amount of catalyst employed, as will be appreciated by those skilled in the art. The course of the reaction may be readily determined by observation of the characteristic infrared absorption bands due to fluorocarbon at about 6 to 7 microns, and the characteristic carbonyl absorption band which occurs in the region of 5 to 6 microns. At the high temperature ranges and with more active catalysts, the conversion time may be a fraction of a second, and thus such temperatures and catalysts are preferred for the continuous gas phase conversion of fluoroolefin epoxides to carbonyl compounds by passing the gaseous epoxide over a solid bed of catalyst. In one preferred embodiment of this invention, gamma alumina is employed as the catalyst at a temperature of between 100° C. and 200° C. for the continuous gas phase conversion of perfluoroolefin epoxides to isomeric carbonyl compounds. If it is desired to manufacture higher molecular weight carbonyl compounds or if it is desired to manufacture small quantities of carbonyl compounds using a batch process, the preferred mode of operation is to contact the fluoroolefin epoxide with the catalyst in solution at temperatures below 100° C.

The reaction of the present invention is an isomerization reaction, and, hence, according to general chemical principles, the pressure at which it is conducted should be of little significance. This is indeed verified by experience for it has been found that pressures of 4000 atmospheres or more may be employed on the one hand, and on the other hand that the reaction may be successfully performed at pressures or partial pressures below atmospheric. The highest pressures, however, are less desirable in that they are inconvenient to employ and may tend to promote side reactions thereby detracting from the yield of the desired product.

The process of the present invention is useful for the synthesis of a wide variety of fluorocarbon carbonyl compounds which are of great value. Fluorocarbon ketones exhibit many of the properties of hydrocarbon ketones in undergoing condensation reactions and the like, thereby providing extremely valuable intermediates for the production of fluorocarbon compounds. In addition, the ketone groups of fluoroketones readily add water, alcohols, and other hydroxylic compounds to yield gem diols, acetals, and the like. It has recently been discovered that the hydrates of many of the ketones embraced as products of the process of this invention are useful as solvents, plasticizers, and the like for many polymeric materials, particularly those containing hydrogen-bondable groups, such as polyamides, acetal resins, and the like.

The acid fluorides wherein the carbonyl group is formed at the terminal carbon atom of the fluorocarbon are likewise valuable intermediates from which acids, esters, amides, and the like containing fluorine substituents may be prepared, many of which derivatives are useful as surface-active agents.

The products of the rearrangement reaction may be isolated by a variety of chemical and physical techniques which are known to those skilled in the art.

Distillation may be employed to separate the fluorocarbon materials from the catalysts and solvent, but, in general, this technique has little utility in separating the isomeric products themselves since the difference in boiling point is generally small.

Gas chromatography is an excellent technique for the separation of small quantities of fluoro organic isomers of an extremely high degree of purity; however, this technique is relatively difficult to apply when large quantities of material are involved.

When ketones are to be recovered from mixtures of perfluoroolefins and perfluoroolefin epoxides, the ketones may be converted to the hydrates which are then readily isolated, and, thereafter, the hydrates may be reconverted to the ketone by the application of strong dehydrating agents such as phosphorus pentoxide.

In the case of acid fluorides, recovery may be effected by conversion to a derivative such as an ester by reacting the acid fluoride with an alcohol, to an acid amide by reaction with ammonia or an amine, or to the acid by reaction with water.

Many other modifications of this invention will occur to those skilled in the art.

The invention is further demonstrated by the following examples which are intended, however, by way of illustration only and should not be construed to limit the scope of this discovery.

EXAMPLE 1

*Vapor phase conversion of hexafluoropropylene epoxide to hexafluoroacetone*

A 1-inch internal diameter, hard glass reaction tube was packed with a 4-inch bed of ⅛ inch alumina spheres (Alcoa H–151, manufactured by the Aluminum Company of America, Pittsburgh, Pa.) supported by a layer of 6 mm. quartz rings. The temperature of the reaction bed was determined by a thermocouple in a well embedded in the catalyst. The alumina bed was heated to 100° C. and hexafluoropropylene epoxide was passed in at the rate of 14 grams/hour concurrently with nitrogen as a carrier gas at the rate of 30 ml./minute. The reaction was halted when 5 to 7 grams of hexafluoropropylene epoxide had been passed. The volatile product of this reaction was collected in a trap immersed in a bath of acetone and solid carbon dioxide. The weight of this product was 2.8 grams, 49% of the theoretical yield. The product was identified as hexafluoroacetone by the appearance of major bands in the infrared spectrum at 5.51 microns (medium); 7.44 microns (strong); 8.20 microns (strong); 10.29 microns (strong); 12.83 microns (weak); and 13.95 microns (strong). Further identification was made by observation of the mass spectral pattern of the gas. The purity (99%) of the product was established by gas chromatographic analysis.

EXAMPLE 2

An alumina column that had previously been used for the synthesis of hexafluoroacetone, as in Example 1, was regenerated by heating to 450° C. in a nitrogen stream for one hour. The column was then cooled to 151° C. A total of 30.6 grams of a mixture of hexafluoroacetone and hexafluoropropylene epoxide, containing 8 to 9 mole percent of hexafluoropropylene, was passed through the alumina bed during a period of approximately two hours. There was collected in the cold trap 26.3 grams (83%) of hexafluoroacetone containing 8 to 9 mole percent of hexafluoropropylene. The material was analyzed by infrared and mass spectrometry. There was no hexafluoropropylene epoxide in the product.

EXAMPLE 3

The apparatus of Example 1 was charged with 50 ml. (40.8 grams) of gamma alumina catalyst which had been previously used for hexafluoroacetone synthesis as in Example 1 and was heated at 450° C. for one hour in a stream of nitrogen. The catalyst bed was allowed to cool to 79° C. Hexafluoropropylene epoxide containing 8 to 9 mole percent of hexafluoropropylene was passed over the catalyst bed at the rate of 10 grams/hour along with a slow stream of nitrogen (25 ml./minute) for 123 minutes. There was obtained 20.2 grams (90%) of volatile product which was identified by mass spectral analysis as being hexafluoroacetone containing 8 to 9 mole percent of hexafluoropropylene.

EXAMPLE 4

*Conversion of hexafluoropropylene epoxide to hexafluoroacetone in solution*

A solution of 85 grams of hexafluoropropylene epoxide in 50 ml. of liquid sulfur dioxide was treated with 5.0 grams of aluminum chloride in a stainless steel cylinder. After standing for three days at room temperature, all of the epoxide had been consumed, as determined by infrared spectral analysis. Distillation of the reaction mixture yielded 14.9 grams, boiling point −45° to −30° C., of a mixture of pentafluoropropionyl fluoride and hexafluoroacetone and 67.0 grams (79%), boiling point −30° C., of hexafluoroacetone with a trace of pentafluoropropionyl fluoride. The products were identified by comparison of their infrared spectra with those of authentic samples.

EXAMPLES 5 TO 8

*Manufacture of perfluorocyclopentanone*

Perfluorocyclopentene, made from commercially available hexafluorodichlorocyclopentene by fluorination with potassium fluoride in the presence of N-methyl pyrrolidone, was converted to the epoxide by the following process.

2.28 moles of perfluorocyclopentene was mixed with 515 grams of 30% w./v. hydrogen peroxide (4.56 moles $H_2O_2$) and 250 ml. of reagent grade methanol. The mixture was cooled to −15° C. 1450 ml. of a 25% w./v. solution of potassium hydroxide in methanol was added dropwise to the mixture of perfluorocyclopentene and hydrogen peroxide over a period of about six hours, maintaining the temperature below −10° C. and maintaining the pH at a value in the range between pH 8 and pH 10. The crude organic product of this process weighed 208 grams. This was separated by distillation into two fractions, the larger of which, 83.5% of the total, was shown by infrared analysis to contain 70% of the desired epoxide and 30% of unreacted perfluorocyclopentene. The smaller fraction (14.5% of the crude) consisted of substantially pure 1-methoxy perfluorocyclopentene.

The mixture of perfluorocyclopentene and perfluorocyclopentene epoxide was then separated by dissolving the mixture in 50 ml. of dichlorofluoromethane, refluxing the solution (boiling point of $CCl_2F_2$=−29° C.); then slowly bubbling chlorine into the solution while irradiating the vessel with an ultraviolet lamp. The progress of the additive reaction of chlorine to the perfluorocyclopentene could be readily followed by observing the rate of decolorization of the solution when the flow of chlorine was interrupted. When the chlorination was complete, distillation of the product yielded 131.6 grams of perfluorocyclopentene epoxide, boiling point 26.5° C. (Fluorine by elemental analysis 67.5 and 67.3%—Calc. for $C_5F_8O$, 66.7%.) The infrared spectrum showed a strong band at 6.55 microns characteristic of the epoxide ring. The nuclear magnetic resonance spectrum was consistent with perfluorocyclopentene epoxide exclusively in the "chair" conformation.

Small samples of the perfluorocyclopentene epoxide prepared above were weighed into platinum tubes together with a weighed amount of catalyst. The tubes were crimped to seal the contents, then the tubes were placed in a pressure vessel and pressurized to about 500 atmospheres. The pressure vessel was heated to 150° C. and the temperature raised to 300° C. over 1½ hours. The temperature was then held at about 300° C. for a further two hours. The vessel was then cooled, the pressure released and the contents of the platinum tubes removed and analyzed. The results of these experiments are shown in Table I.

TABLE I

| Ex. | Weight of Perfluorocyclopentene Epoxide (grams) | Catalyst | Weight of Catalyst (grams) | Results |
|---|---|---|---|---|
| 5 | 2.0 | None | | No reaction. |
| 6 | 1.9 | Gamma alumina | 0.1 | 1.4 gm. product ~10% ketone. |
| 7 | 2.6 | Lignite charcoal | 0.1 | 1.g gm. pure percyclopentanone. |
| 8 | 2.0 | CsF | 0.002 | 1.5 gm. of pure perfluorocyclopentanone. |

The perfluorocyclopentanone produced by these reactions was characterized by its infrared and nuclear resonance spectra.

EXAMPLE 9 TO 60

The following examples illustrate the effect of various catalysts in the rearrangement of hexafluoropropylene epoxide. In these examples, two methods were employed to contact the hexafluoropropylene with the selected catalyst:

*Method A.*—The reaction in these experiments was conducted in small platinum tubes of ⅜ inch or ½ inch in diameter and about 7 to 8 inches in length. Lenths of the tubing were heated to a cherry red heat to remove oil, crimped, and sealed at one end. The tubes so prepared were stored in an oven until used.

Liquid and solid catalysts and diluents used in this work were stored in a dry box with a nitrogen atmosphere. The catalyst, solvent or diluent, if employed, were charged into the platinum tube in this box. The tube was then closed with a piece of clamped rubber tubing and transferred from the dry box to a manifold system. The platinum vessel was then cooled to liquid nitrogen temperature and evacuated. Hexafluoropropylene epoxide was condensed in a graduated glass tube attached to the manifold and cooled in solidified carbon dioxide/acetone, and the weight of hexafluoropropylene epoxide determined assuming a density of 1.7 gram/cc. at −78° C. The hexafluoropropylene epoxide was then distilled from the glass measuring tube into the platinum tube.

If gaseous catalysts were employed, these were transferred to the reaction vessel using the vacuum manifold system and the graduated glass tube in the same manner as the hexafluoropropylene epoxide.

With continued cooling to liquid nitrogen temperature, the platinum tube was crimped for a length of 1½ inches using a pair of needle-nose pliers, then a cut made across the crimped section with an oxygen-gas torch. The tubes so charged were stored in solid carbon dioxide prior to experimentation.

One or more of the platinum tubes, loaded as described hereinabove were placed in a steel shaker vessel, pressured with nitrogen and heated to the desired temperature for the desired period of time. The assembly was then cooled and the nitrogen pressure released. The sealed platinum tube was then cooled to liquid nitrogen temperature. The platinum tube was cut open while the contents were frozen, rapidly connected to the vacuum manifold and evacuated. The contents were then discharged by distillation and examined by infrared analysis.

*Method B.*—In this method, the platinum tubes were replaced with glass Carius tubes. The Carius tubes were carefully dried and loaded with solvent and catalyst in a dry box, then attached to a vacuum manifold and filled with the predetermined charge of hexafluoropropylene epoxide as in the case of the platinum tubes. The contents of the tube were frozen in liquid nitrogen and the glass tube sealed. The tubes were then loaded in a steel shaker tube and the pressure and temperature slowly increased simultaneously in order to maintain a pressure outside the tubes roughly equal to the pressure of the contents in order to prevent explosion or implosion of the glass tube. After heating for the predetermined period, the pressure and temperature were then simultaneously decreased. The tubes were removed, frozen, cut open, sealed to a vacuum line and the contents removed and analyzed.

The results of these experiments are recorded in the accompanying Table II. In this table, the starting material was a mixture of hexafluoropropylene epoxide and hexafluoropropylene, the content of the epoxide being recorded in weight percent in the appropriate column of Table II.

In the experiments carried out at room temperature and below, and at autogenous pressure, instead of heating the tubes in a shaker tube, they were placed in a constant temperature bath. Suitable baths were ice water (0° C.), refluxing liquid $SO_2$ (−10° C.), and refluxing methyl chloride (−24° C.). In some experiments, the low temperature was maintained within a fairly narrow range of values by storing the tubes in a beaker of perchloroethylene kept in the freezer compartment of a refrigerator.

TABLE II

| Ex. | Method | Starting Material: Weight Percent Hexafluoropropylene Epoxide in Hexafluoropropene | | Catalyst | Weight of Catalyst (grams) | Solvent | Volume of Solvent (ml.) | Temperature (° C.) | Pressure (atm.) | Time (hrs.) | Results |
|---|---|---|---|---|---|---|---|---|---|---|---|
| | | Percent | Wt. in grams | | | | | | | | |
| | A | 60 | | $KHF_2$ | 10 | Dimethylformamide | 250 | 25 | ∼1 | 16 | Product mainly $CF_3CF_2COF$. |
| | A | 88 | 4.9 | $SnCl_4$ | 0.15 | None | | 250 | 55 | 4 | Same hexafluoroacetone formed. |
| | A | 99.4 | 12 | $FeCl_3$ | 0.1 | Ether | 1 | 100 | 2,000 | 4 | $CF_3COCF_3$, $CF_3CF_2COF$ and epoxide in ∼2/1/1 ratio. |
| | B | 88 | 5.1 | $AlCl_3$ | 0.1 | None | | 100 | 38 | 4 | 5.0 gram material mainly $CF_3COCF_3$. |
| | B | 88 | 4.0 | $AlCl_3$ | 0.1 | ----do---- | | 200 | 37 | 4 | $CF_3COCF_3$ major product. |
| | B | 88 | 5.7 | $AlCl_3$ | 0.1 | ----do---- | | 250 | 41 | 4 | $CF_3COCF_3$ major product. |
| | B | 99.4 | 4.7 | $Na_2CO_3$ | 1 | ----do---- | | 150 | 160 | 4 | Complete reaction. $CF_3CF_2COF$ major product. |
| | B | 99.4 | 5.2 | Dimethylaniline | 0.15 | ----do---- | | 100 | 160 | 2 | Small amount of red gum. Major product was $CF_3CF_2COF$. |
| | B | 99.4 | 5 | ----do---- | 0.15 | ----do---- | | 150 | 174 | 2 | 4.7 gram $CF_3CF_2COF$, black gum residue. |
| | A | 99.4 | 12 | ----do---- | ∼0.1 | Ether | 1 | 75 | 2,000 | 4 | All of epoxide converted to acid fluorides, $CF_3CF_2COF$ present. |
| | A | 99.4 | 12 | ----do---- | ∼0.1 | ----do---- | 1 | 25 | 2,000 | 16 | Small amount of $CF_3CF_2COF$. |
| | A | 99.4 | 13.4 | Dimethylformamide | ∼0.15 | None | | 100 | 2,000 | 2 | Most of epoxide rearranged to $CF_3CF_2COF$. |
| | B | 99.4 | 5 | Triethylamine | 0.1 | Ether | 1 | 140 | 197 | 4 | Few drops of water-soluble red oil + $CF_3CF_2COF$. |
| | B | 99.4 | 4.9 | CuO | 0.2 | None | | 140 | 167 | 4 | Trace of $CF_3CF_2COF$. |

TABLE II—Continued

| Ex. | Method | Starting Material: Weight Percent Hexafluoropropylene Epoxide in Hexafluoropropene | | Catalyst | Weight of Catalyst (grams) | Solvent | Volume of Solvent (ml.) | Temperature (° C.) | Pressure (atm.) | Time (hrs.) | Results |
|---|---|---|---|---|---|---|---|---|---|---|---|
| | | Percent | Wt. in grams | | | | | | | | |
| 23 | B | 99.4 | 4.7 | $Al_2O_3$ | 0.2 | ___do___ | | 140 | 161 | 4 | $CF_3COCF_3$ major product and trace of acid fluoride. |
| 24 | B | 99.4 | 5.5 | $PbO_2$ | 0.2 | ___do___ | | 140 | 187 | 4 | Trace of acid fluoride ($CF_3CF_2COF$). |
| 25 | B | 99.4 | 5.5 | CsF | 0.2 | ___do___ | | 140 | 187 | 4 | Small amount of acid fluoride ($CF_3CF_2COF$). |
| 26 | B | 99.4 | 5.1 | $PF_5$ | [1] 63 | ___do___ | | 140 | 173 | 4 | Very small amounts of $CF_3COCF_3$ + acid fluoride ($CF_3CF_2COF$). |
| 27 | B | 99.4 | 5 | $SF_4$ | [1] 54 | ___do___ | | 140 | 170 | 4 | Very small amounts of $CF_3COCF_3$ + acid fluoride ($CF_3CF_2COF$). |
| 28 | B | 99.4 | 5 | $BF_3$ etherate | 0.4 | ___do___ | | 140 | 170 | 4 | Trace acid fluoride ($CF_3CF_2COF$). |
| 29 | B | 99.4 | 5 | $FeCl_3$ | 0.2 | ___do___ | | 140 | 170 | 4 | Major product $CF_3COCF_3$, trace acid fluoride ($CF_3CF_2COF$). |
| 30 | B | 99.4 | 5 | $VOCl_3$ | 0.2 | ___do___ | | 140 | 170 | 2 | Major product $CF_3COCF_3$. |
| 31 | B | 99.4 | 4.9 | $TiCl_4$ | 0.2 | ___do___ | | 140 | 166 | 2 | Small amount of $CF_3COCF_3$. |
| 32 | B | 99.4 | 5.3 | Pyridine-N-oxide | 0.2 | ___do___ | | 140 | 180 | 2 | Small amount of $CF_3CF_2COF$. |
| 33 | B | 99.4 | 5 | Hexamethylene tetramine. | 0.1 | Ether | 1 | 100 | 178 | 4 | Almost quantitative conversion to $CF_3CF_2COF$. |
| 34 | B | 99.4 | 5 | ___do___ | 0.1 | ___do___ | 1 | 50 | [2] | 4 | High conversion to $CF_3CF_2COF$. |
| 35 | A | 99.4 | 12 | ___do___ | 0.1 | ___do___ | 1 | 50 | 4,000 | 4 | Some $CF_3CF_2COF$. |
| 36 | B | 99.4 | 5.1 | Tetramethylguanidine. | 0.15 | None | | 140 | 173 | 4 | 0.5 gram of nitrogenous liquid: high conversion to $CF_3CF_2COF$. |
| 37 | B | 99.4 | 5.2 | Tetrakis(diethylamino)ethylene. | 0.15 | ___do___ | | 140 | 176 | 4 | Water-soluble red tar, 5.1 gram $CF_3CF_2COF$. |
| 38 | A | 99.4 | 12 | Pyridine | 0.1 | Ether | 1 | 75 | 4,000 | 4 | 0.3 gram water-soluble black oil, remainder $CF_3CF_2COF$. |
| 39 | A | 99.4 | 12 | Reduced iron oxide. | 0.5 | None | | 100 | 4,000 | 4 | Large amount of $CF_3CF_2COF$, lesser amounts of $CF_3COCF_3$ and other fluorine compounds. |
| 40 | A | 99.4 | 12 | Reduced cobalt oxide. | 0.5 | ___do___ | | 100 | 4,000 | 4 | Major product $CF_3COCF_3$: some acid fluorides mainly ($CF_3CF_2COF$). |
| 41 | A | 99.4 | 12 | Reduced $Cr_2O_3$ on Charcoal. | 1.5 | ___do___ | | 140 | 4,000 | 4 | Small amount $CF_3CFC_2OF$, decomp. products. |
| 42 | A | 99.4 | 12 | ___do___ | 1.5 | ___do___ | | 100 | 4,000 | 4 | 0.3 gram oil, remainder of epoxide converted to $CF_3CF_2COF$. |
| 43 | A | 99.4 | 12 | Lower valent tungsten oxide on charcoal. | 1.5 | ___do___ | | 140 | 4,000 | 4 | 1.8 gram liquid product, remainder $CF_3CF_2COF$. |
| 44 | A | 99.4 | 12 | Reduced onium oxide on charcoal. | 1.5 | ___do___ | | 140 | 4,000 | 4 | 0.9 gram liquid, remainder $CF_3CF_2COF$. |
| 45 | A | 99.4 | 12 | ___do___ | 1.5 | ___do___ | | 100 | 4,000 | 4 | 0.3 gram liquid, remainder $CF_3CF_2COF$. |
| 46 | A | 99.4 | 12 | Chromium oxide on alumina, $O_2$ pyrolyzed. | 1 | ___do___ | | 100 | 4,000 | 4 | Mostly hexafluoroacetone, some acid fluoride. |
| 47 | A | 99.4 | 12 | $WO_3$ on $Al_2O_3$ | 1.5 | ___do___ | | 100 | 4,000 | 4 | Complete conversion to $CF_3COCF_3$ + acid fluorides (mainly $CF_3CF_2COF$). |
| 48 | A | 99.4 | 12 | $MoO_3$ on $Al_2O_3$ | 1.5 | ___do___ | | 100 | 4,000 | 4 | $CF_3COCF_3$ principal product. |
| 49 | A | 99.4 | 12 | $W(CO)_6$ | 0.5 | ___do___ | | 100 | 4,000 | 4 | Small amount of $CF_3COCF_3$. |
| 50 | A | 99.4 | 12 | $Fe(CO)_5$ | 0.3 | ___do___ | | 100 | 4,000 | 4 | Major conversion to $CF_3COCF_3$. |
| 51 | A | 99.4 | 12 | $WO_2$ | 1 | ___do___ | | 100 | 4,000 | 4 | Major conversion to $CF_3COCF_3$, some acid fluorides (mainly $CF_3CF_2COF$). |
| 52 | A | 99.4 | 7 | $TiO_2$ on $Al_2O_3$ | 1 | ___do___ | | 100 | 4,000 | 4 | Major product was $CF_3COCF_3$. |
| 53 | A | 99.4 | 7 | Reduced $CrO_3$ on silica-alumina. | 0.5 | ___do___ | | 100 | 4,000 | 4 | Nearly quantitative conversion to hexafluoroacetone. |
| 54 | A | 99.4 | 7 | Ni Molybdite | 1.1 | ___do___ | | 100 | 4,000 | 4 | $CF_3COCF_3$ produced. |
| 55 | A | 99.4 | 7 | Bauxite (dried) | 0.5 | ___do___ | | 25 | [2] | 48 | Small amount of $CF_3COCF_3$ and $CF_3CF_2COF$. |
| 56 | A | 99.4 | 7 | Trimethylamine | 0.053 | ___do___ | | −15 | [2] | 48 | 0.2 gram dimer 1.5 gram $CF_3CF_2COF$. |
| 57 | A | 99.4 | 7 | Triethylamine | 0.1 | Ether | 2 | −5 to −15 | [2] | [3] 4 | 5.4 gram $CF_3CF_2COF$. |
| 58 | A | 99.4 | 7 | ___do___ | 0.1 | Tetrahydrofuran. | 2 | −5 to −15 | [2] | [3] 4 | 3.4 gram $CF_3CF_2COF$. |
| 59 | A | 99.4 | 7 | Pyridine | 0.1 | Ether | 2 | −5 to −15 | [2] | [3] 4 | 2.4 gram $CF_3CF_2COF$. |
| 60 | A | 99.4 | 7 | Dimethylformamide. | 0.1 | Tetrahydrofuran. | 2 | −5 to −15 | [2] | [3] 4 | 3.1 gram $CF_3CF_2COF$. |

[1] Milligrams.  [2] Autogenous.  [3] Days.

EXAMPLE 61

*Rearrangement of omega-hydroperfluoroheptene-1-epoxide to omega-hydroperfluoroheptanoyl fluoride*

A 3-gram sample of omega-hydroperfluoroheptene-1 epoxide was placed in a glass Carius tube. The tube was cooled to −80° C. and evacuated. There was then introduced 0.5 gram of trimethylamine and the tube was sealed. After heating to 50° C. for two hours, the tube was opened and 1.8 gram (60%) of omega-hydroperfluoroheptanoyl fluoride, boiling point 88 to 91° C., was isolated.

EXAMPLE 62

*Rearrangement of omega-hydroperfluoroheptene-1-epoxide to 7-hydroperfluoro-2-heptanone*

The procedure of Example 61 is repeated using 0.2 gram of ferric chloride instead of trimethyl amine and a temperature of 135° C. There are isolated 7-hydroperfluoro-2-heptanone, boiling point 87 to 89° C., in 50% yield together with trace amounts of omega-hydroheptanoyl fluoride.

EXAMPLE 63

*Rearrangement of tetrafluoroethylene epoxide to perfluoroacetyl fluoride*

A 125 ml. gas bulb was filled to a pressure of 600 to 700 mm. with a 2/1 mixture of tetrafluoroethylene oxide and tetrafluoroethylene. There was then introduced 20 ml. of gaseous trimethyl amine. The gas mixture was allowed to stand at room temperature for several minutes. An infrared spectrum then indicated all the tetrafluoroethylene oxide to have been converted to perfluoroacetyl fluoride, boiling point −59° C.

EXAMPLE 64

*Rearrangement of perfluoroisobutylene oxide to perfluoroisobutyryl fluoride*

To a 50 ml. Carius tube containing 0.6 gram of "Darco" 2 x 20 charcoal, previously dried at 400° C., was added 5.6 grams of perfluoroisobutylene oxide, boiling point 0 to 5° C. The tube was sealed and kept at 0 to 25° C. for 8 hours. There was recovered by distillation 5.2 gram of mixture of perfluoroisobutyryl fluoride, boiling point −3° to −1° C., and a second acid fluoride of boiling point 43 to 44° C. The perfluoroisobutyryl fluoride was shown by gas chromatography to constitute 25 to 35% of the mixture. A pure sample exhibited NMR and IR spectra identical to those of an authentic sample prepared by reaction of carbonyl fluoride with hexafluoropropylene catalyzed by potassium fluoride. The second acid fluoride was shown to have the structure $$CF_3CF(CF_3)CF_2OC(CF_3)_2CFO$$

EXAMPLES 65–68

*Preparation of perfluorocyclohexanone*

Perfluorocyclohexene, prepared by the fluorination of either 1,2-dichloroperfluorocyclohexene-1 or 1,2,4,4,5,5-hexachloro-3,3,6,6-tetrafluorocyclohexene-1 with potassium fluoride in the presence of N-methylpyrrolidone, was converted to the epoxide as follows.

A mixture of 52.4 grams (0.20 mol) of perfluorocyclohexene, 50 ml. of absolute methanol and 35 ml. (ca. 0.3 mol) of 30% hydrogen peroxide was cooled to −15° C. 130 ml. of a 20% solution of potassium hydroxide in methanol was added dropwise over a three hour period maintaining the temperature between −15° and −25° C. and the pH within the range 8 to 10. At the end of this time a sample of the crude organic product showed no unsaturation at 5.7 to 5.8 microns in the infrared but a strong epoxide band at 6.7 microns. The volatile products were removed by distillation under 25 to 30 mm. pressure. The lower fluorocarbon layer was separated and fractionally distilled to give 28.8 grams (52%) of perfluorocyclohexene epoxide; B.P. 53 to 55°.

*Analysis.*—Calc'd for $C_6F_{10}O$: percent C, 25.9; percent F, 68.3. Found: percent C, 25.5, 25.7; percent F, 68.1, 68.0.

Samples of the perfluorocyclohexene epoxide prepared above were placed in sealed glass tubes with cesium fluoride as the catalyst and heated at different temperatures for two hours. The tubes were cooled and the contents analyzed by infrared analysis. The results of these runs are shown in Table III. The ketone was identified by infrared spectra and elemental analysis.

TABLE III

| Ex. | Weight of Perfluorocyclohexene Epoxide, g. | Wt. Cesium Fluoride, g. | Temperature, °C. | Results |
|---|---|---|---|---|
| 65 | 1.55 | 0.003 | 300 | 0.7 g. pure perfluorocyclohexanone. |
| 66 | 1.66 | 0.003 | 200 | 0.9 g. product 50% ketone. |
| 67 | 1.64 | 0.003 | 250 | 0.85 g. pure perfluorocyclohexanone. |
| 68 | 26.8 | 2.3 | ¹ 300 | 10.7 g. redistilled perfluorocyclohexanone, B.P. 54 to 56°. |

¹ Heated in a 320 ml. Hastelloy bomb for three hours.

We claim:

1. A method for making fluorinated carbonyl compounds which comprises contacting a compound having the chemical formula

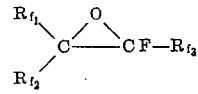

wherein $R_{f_1}$, $R_{f_2}$ and $R_{f_3}$ are radicals selected from the class consisting of fluorine radicals, perfluoroalkyl radicals having from 1 to 8 carbon atoms, omega-hydroperfluoroalkyl radicals having from 1 to 8 carbon atoms and, pairwise, perfluoroalkylene biradicals having from 2 to 8 carbon atoms, with a catalytic amount of an alkali metal fluoride and thereafter recovering a fluorinated carbonyl compound from the reaction product.

2. Process of manufacturing perfluorocyclopentanone which comprises contacting perfluorocyclopentene epoxide with a catalytic amount of an alkali metal fluoride and recovering perfluorocyclopentanone from the reaction product.

3. Process of manufacturing perfluorocyclohexanone which comprises contacting perfluorocyclohexene epoxide with a catalytic amount of an alkali metal fluoride and recovering perfluorocyclohexanone from the reaction product.

4. Process of manufacturing said fluorides having the composition $R_fCF_2COF$ wherein $R_f$ is a perfluoroalkyl radical having from 1 to 8 carbon atoms which comprises contacting a 1-fluoroolefin epoxide having the formula

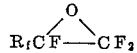

with a catalytic amount of an alkali metal fluoride and thereafter recovering an acid fluoride from the reaction product.

5. Process of claim 4 wherein the said 1-fluoroolefin epoxide is hexafluoropropylene epoxide.

6. Process of making fluorinated ketones having the formula $R_f$—$COCF_3$, wherein $R_f$ is selected from the class consisting of perfluoroalkyl radicals having from 1 to 8 carbon atoms and omega-hydroperfluoroalkyl radicals having from 1 to 8 carbons, which comprises contacting a compound having the formula

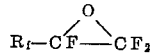

with aluminum trichloride in the presence of a chemically inert solvent at a temperature in the range between $-80°$ C. and $100°$ C., and thereafter recovering a fluorinated ketone from the reaction products.

7. Process of claim 6 wherein the said chemically inert solvent is liquid sulfur dioxide.

8. Process of claim 7 wherein the compound having the formula

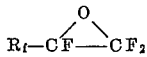

is hexafluoropropylene epoxide.

9. The method of making fluoroketones having the chemical formula $R_f—COCF_3$ wherein $R_f$ is selected from the class consisting of perfluoroalkyl radicals having from 1 to 8 carbon atoms and omega-hydroperfluoroalkyl radicals having from 1 to 8 carbon atoms which comprises passing the vapor of a fluoroepoxide having the formula

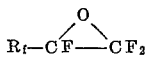

over gamma-alumina at a temperature in the range between $100°$ C. and $200°$ C., and thereafter recovering a fluoroketone from the reaction product.

10. Method of claim 9 in which the compound having the chemical formula

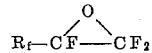

is hexafluoropropylene epoxide.

References Cited by the Examiner

UNITED STATES PATENTS

| | | | |
|---|---|---|---|
| 1,976,265 | 11/1934 | Mugdan et al. | 260—544 |
| 2,456,768 | 12/1948 | Chaney | 260—544 X |
| 2,799,708 | 7/1957 | Oakley et al. | 260—586 X |
| 3,009,959 | 11/1961 | Heath et al. | 260—586 X |
| 3,151,167 | 9/1964 | Eisenmann et al. | 260—586 |
| 3,213,134 | 11/1965 | Morin | 260—544 |

OTHER REFERENCES

Wethington et al., "Chem. Abstracts," vol. 54 (1960), p. 23674e.

McBee et al., "J. Am. Chem. Soc.," vol. 78, pp. 3851–3854 (1956).

LORRAINE A. WEINBERGER, *Primary Examiner.*

R. K. JACKSON, *Examiner.*